Aug. 21, 1934.  W. F. HAMILTON  1,971,038
THERMAL CONDUCTIVITY CELL
Filed March 25, 1932
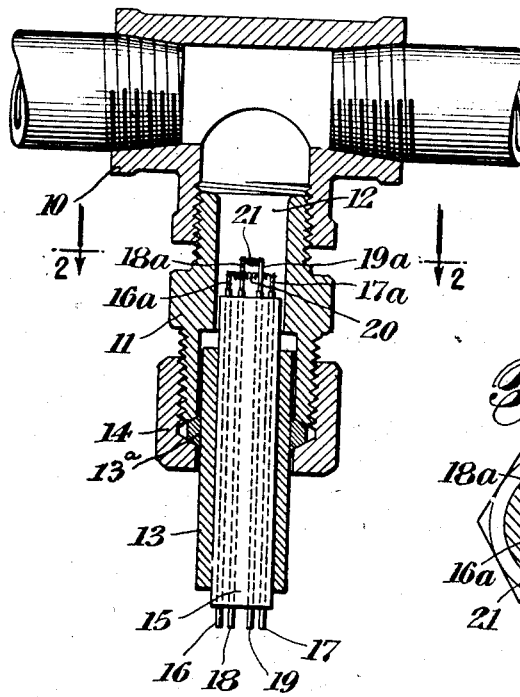
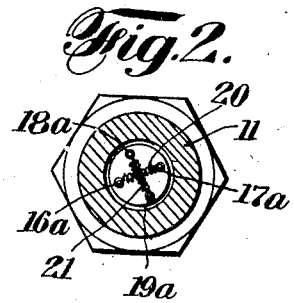
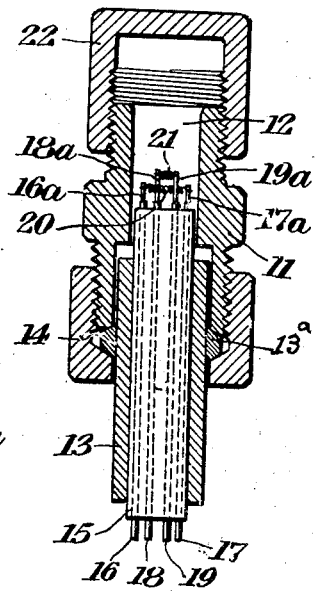
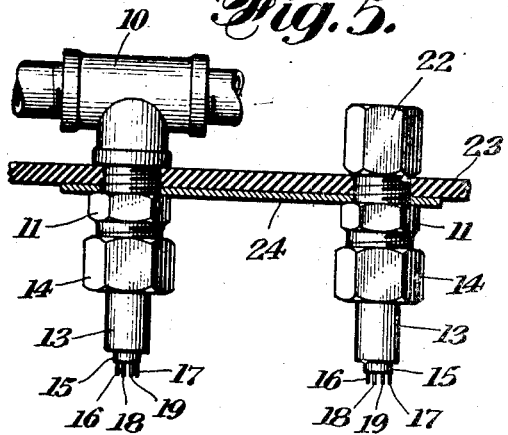
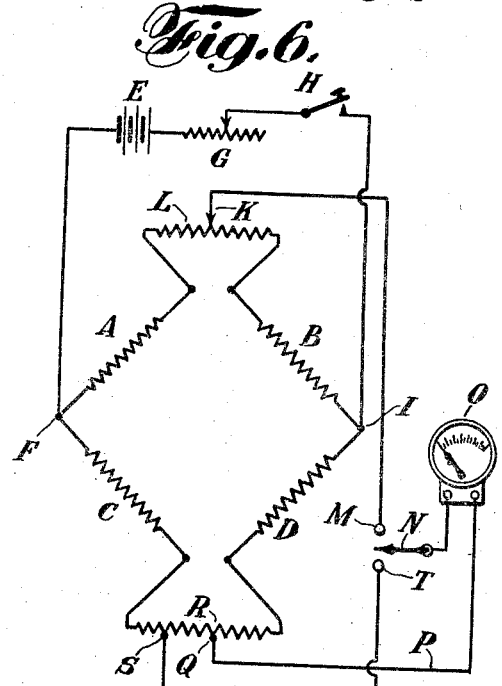
INVENTOR
WILLIAM F. HAMILTON
BY
Knight Bro
ATTORNEYS Patented Aug. 21, 1934

1,971,038

UNITED STATES PATENT OFFICE 1,971,038

THERMAL CONDUCTIVITY CELL

William F. Hamilton, New York, N. Y., assignor to Charles Engelhard, Inc., Newark, N. J., a corporation of New Jersey Application March 25, 1932, Serial No. 601,094

4 Claims. (Cl. 73—51)

This invention relates in general to thermal conductivity cells as used, for example, in gas analysis.

Gas analysis apparatus as heretofore designed and constructed has been quite expensive. The poor sensitivity of the gas chamber unit has been such as to require the use of very delicate meters or recording devices, which impose a serious item of expense on the apparatus. The gas chamber unit itself has also been made a relatively expensive element as a result of the refinements introduced in an attempt to secure adequate sensitivity and reliability under the principles of construction employed. Furthermore, the apparatus, on account of its delicate construction, has been particularly sensitive to mechanical shock and other influences such as wall corrosion, humidity and dampness conditions, and chemical influences from the gas being tested.

A primary object of my present invention is to provide a new type of gas chamber unit so simple, rugged, inexpensive and responsive as to greatly reduce the cost of gas analysis apparatus in which the unit is employed. By reason of the new principles of construction employed, much less sensitivity in the meter or recording device is required, and hence the considerable cost of such meters or recording devices as heretofore employed is substantially lowered.

Certain embodiments of the invention are shown in illustrative form in the accompanying drawing, in which Figure 1 is a central longitudinal section through one form of the gas chamber unit, mounted in a pipe T for exposure to the gas to be analyzed.

Figure 2 is a cross-section thereof on the line 2—2 of Figure 1.

Figure 3 is a similar view of a modified disposition of the resistance wires in the unit.

Figure 4 is a central longitudinal section, similar to Figure 1, showing one of the units with a closed gas space.

Figure 5 is an external view of the panel mounting of two units, such as shown in Figures 1 and 4, for comparison of an unknown with a known gas; and Figure 6 is a diagram of a Wheatstone's bridge circuit, which may be employed in the apparatus.

Thermal conductivity cells, of the type to which my invention relates primarily, serve to indicate the proportions of the known constituents of a gas mixture by the heat conductivity of the mixture. To perform this function, the cells are provided with resistance wires mounted in a gas space accessible to the gas to be analyzed, and have passed through these resistance wires small heating currents which, for a given applied voltage, raise their temperature to a point dependent upon the thermal conductivity of their gaseous environment. Heat developed in the resistance wires is conducted through the gas to the walls of the gas chamber, and thus a stable filament temperature is reached when the heat loss or dissipation equals the heat generated by the applied voltage. The resistance wire temperature determines its resistance, and by suitably connecting such resistance wires in a Wheatstone's bridge circuit, indications or records of the gas conductivity, and hence the proportions of its known constituents, may be derived.

The unit illustrated in Figure 1 is mounted in a pipe T connection 10 by the threaded end of a nipple 11 which provides the gas chamber 12 in communication with the gas to be tested, which may be passed through the main line of the T connection 10 and permitted to diffuse into the gas chamber 12. The outer end of the nipple 11 is of suitable bore (preferably larger than the bore of gas chamber 12) to receive the copper tube 13. The peripheral ring 13ª on copper tube 13 is drawn tightly down against the chamfered end of the nipple 11 by means of a compression nut 14. Through the bore of copper tube 13 extends a porcelain insulator core 15 provided with four ducts or bores for the lead-in wires 16, 17, 18 and 19, terminating in small nickel spud wires 16ª, 17ª, 18ª and 19ª, which project into the gas chamber 12. As shown clearly in Figures 1 and 2, a helical filamentary resistance wire 20 is stretched from spud wire 16ª to spud wire 17ª on an axis substantially perpendicular to the main axis of the gas chamber 12, and a similar resistance wire 21 is stretched between the ends of spud wires 18ª, 19ª on an axis which is also substantially perpendicular to the main axis of nipple 11. In this embodiment, the spud wires 18ª, 19ª project further into the gas chamber 12 than the spud wires 16ª and 17ª, and the two resistance wires 20 and 21 are disposed in planes at right angles to each other to minimize the thermal influence of the one upon the other. In Figure 3 of the drawing, helical filamentary resistance wires 20' and 21' are mounted on axes which are disposed parallel to each other but transversely of the main axis of gas chamber 12. In this example, the supporting spud wires of one resistance may or may not project a different distance into the gas chamber from those of the other.

The lead-in wires 16, 17, 18 and 19 are preferably sealed in the porcelain insulator core 15, by means of sealing wax or the like, and the core may be similarly sealed to the copper tube 13. The filaments 20, 21 may thus be securely maintained at such positions as may be desired within the gas chamber 12. Greater time lag in obtaining a reading will prevail when the filaments are more remote from the main line of pipe T fitting 10, and less time lag will prevail as the filaments are mounted closer to the main line. The sealing of the lead-in wire passages and the seating of the compression fitting 14 upon the end of nipple 11, effectively close the gas chamber 12 against any direct flow of gas through the chamber 12, so that communication between such chamber and the main line of the gas supply is substantially dependent upon diffusion and convection, and thus the disturbing influence of extraneous gas currents around the filaments 20 and 21 is practically eliminated.

The construction shown in Figure 4 is the same as that already described in connection with Figure 1, with the exception of the substitution of a closure cap 22 for the T fitting 10 of Figure 1. Obviously, the parts may otherwise be identical.

In Figure 5, the mounting of the parts shown in Figures 1 and 4 includes a panel 23, which may be of either conductive or insulating material, but when of material which is not a good conductor of heat it is supplemented by a strip of highly conductive metal 24, which maintains a temperature equalization between the two units for the purposes of avoiding certain errors which would otherwise occur in the observations.

Referring to Figure 6, the Wheatstone's bridge circuit includes the resistances A, B, C, D, of which A and D may, for example, be the filaments 20 and 21 of Figure 1, exposed to the gas to be analyzed, and resistances C and B may be the filaments 20 and 21 shown in Figure 4, where they are exposed to a known gas which may be permanently confined by the cap 22, if desired. E represents a source of energizing current which is connected at one side to the point F, and at the other side through a variable resistance G and switch H to the point I. A slide contact or tap K is movable along the resistance L, and is connected with the switch point M. A switch arm N may be moved into contact with switch point M to connect into the bridge circuit a micro-ammeter O by way of the conductor P, which is connected at a suitable point Q in the resistance R, which is normally at the same voltage as the point at which the slide or tap K is connected to the resistance L. A second connection is made with the resistance R at any desired point S, so that by closing the switch arm N on a contact T, which is connected with point S, the meter O may be shunted across a portion of the resistance R to serve as a measure of the current passing through the bridge while adjusting the resistance G. Adjustment of the slide contact on resistance G determines the strength of current supplied to the bridge, and adjustment of tap K on resistance L, with switch N closed on M, will then enable the meter O to be readily brought to a desired normal reading from which a departure either above or below will indicate a change in the composition of the gas in the gas chamber 12. Such adjustment will normally be made prior to the admission of the gas to be tested. When this adjustment has been made, the unknown gas is permitted to flow through the main line of the T connection 10, and by diffusion into chamber 12 will affect the thermal conductivity prevailing therein and thus determine the temperature at which the temperature of the two filaments A and D (Figure 6) will become stabilized. Such temperature will determine the resistance of the corresponding branches of the bridge. The resistances C and B of the bridge will become stabilized at a temperature dependent upon the conductivity of the gas space of the cell illustrated in Figure 4. The voltage difference between points K and Q will vary with the heat conductivity of the gas within the chamber 12 in Figure 1 and cause a deflection of the meter or recording device which may be interpreted in terms of percentage composition of the known constituents of the gas mixture passing through the main line of the pipe T connection 10.

The parts employed in the construction of this thermal conductivity cell are standard constructions of wide industrial use and readily available at reasonable cost. The helical resistance wires 20, 21 may be, for example, tungsten filaments from standard switchboard incandescent lamps, or straight nichrome wire. The lead-in wires 16, 17, 18 and 19 may be ordinary iron wire, the porcelain insulators 15 are in common use in many electrical fixtures, and the compression fitting 11, 13ᵃ, 14 is produced in large quantity for copper tube connections. By the use of iron lead-in wires, thermal conductivity of the filament leads is maintained comparatively low, with consequent reduction in the tendency to dissipate heat energy from the filaments through the supports. By the use of short helical tungsten filaments, the positive temperature coefficient of the tungsten confers good sensitivity, and the arrangement of these filaments on axes perpendicular to the walls of the gas chamber greatly reduces the local transfer of heat from the filaments into the adjacent wall surfaces and, because of the large area of contact with the gas, imposes much greater dependence upon the conductivity of the enclosed gas in leading off heat from the filaments and delivering it to the chamber walls. The effect of wall corrosion on the response of the instrument is thus reduced, and the metal walls may be left bare and unlined. Such filament construction and mounting also provide mechanical strength and steadiness against vibration and shock, and definitely prevent any alteration or irregularity of effective distance from filament to side wall, as readily occurs, for example, in the case of elongated filaments extending in an axial direction from one end of the gas chamber to the other.

I find, for example, that the transverse mounting of either one or two filaments, whether straight or helical, renders the effect of cell wall corrosion practically negligible, perhaps due to the much greater proportion of the temperature drop occurring in the gas and the reduction of radiation effects. The particular test circuit illustrated in Figure 6 may be regarded as merely conventional, as thermal conductivity cells are employed in many different ways and employ many different circuits. The known gas may, of course, be air or any other standard of comparison, and either confined, as shown in Figure 4, or supplied, as shown in Figure 1. While I have mentioned the use of iron lead-in wires, it is obvious that other materials of low thermal conductivity and fair electrical conductivity may be employed, such as for example nickel or constantan alloy, to limit the metallic conduction of heat away from the filaments 20 and 21, and reduce temperature coefficient effects in the leads.

I claim:—

1. A thermal conductivity cell comprising in combination a member providing a generally cylindrical gas chamber, a pair of resistance filaments mounted therein on axes generally perpendicular to each other and to the longitudinal axis of said gas chamber, and means for conducting electric current to and from said resistance filaments, the axes of the filaments traversing each other at substantially their mid-points and intersecting the longitudinal axis of the chamber.

2. A thermal conductivity cell comprising in combination a nipple having a gas chamber in one end, a metal tube sealed in the other end of said nipple, a porcelain insulator core extending through said metal tube and having a pair of lead-in wires passing through ducts to said gas chamber, and a resistance filament connected with the ends of said lead-in wires and extending transversely across said gas chamber.

3. A thermal conductivity cell comprising in combination a nipple having a gas chamber in one end, a metal tube entering the other end of said nipple, a compression fitting for securing and sealing said metal tube to said nipple, a porcelain insulator core sealed in said metal tube and having a pair of ducts leading to said gas chamber, a pair of lead-in wires extending through said ducts to said gas chamber with projections into the free space thereof, and a resistance filament mounted on the ends of said projections and extending generally transversely of the axis of said gas chamber.

4. In a thermal conductivity cell, a pair of non-parallel resistance elements, said elements being positioned in parallel planes generally transverse to the longitudinal axis of the cell.

WILLIAM F. HAMILTON.